March 7, 1933.  L. M. HILE  1,900,712

MACHINE FOR MAKING AND INSERTING BASKET HANDLES

Filed May 18, 1931  14 Sheets-Sheet 1

Inventor:
Leslie M. Hile
By Arthur F. Durand

March 7, 1933. L. M. HILE 1,900,712
MACHINE FOR MAKING AND INSERTING BASKET HANDLES
Filed May 18, 1931 14 Sheets-Sheet 2

Inventor:
Leslie M. Hile
By Arthur F. Durand
Atty.

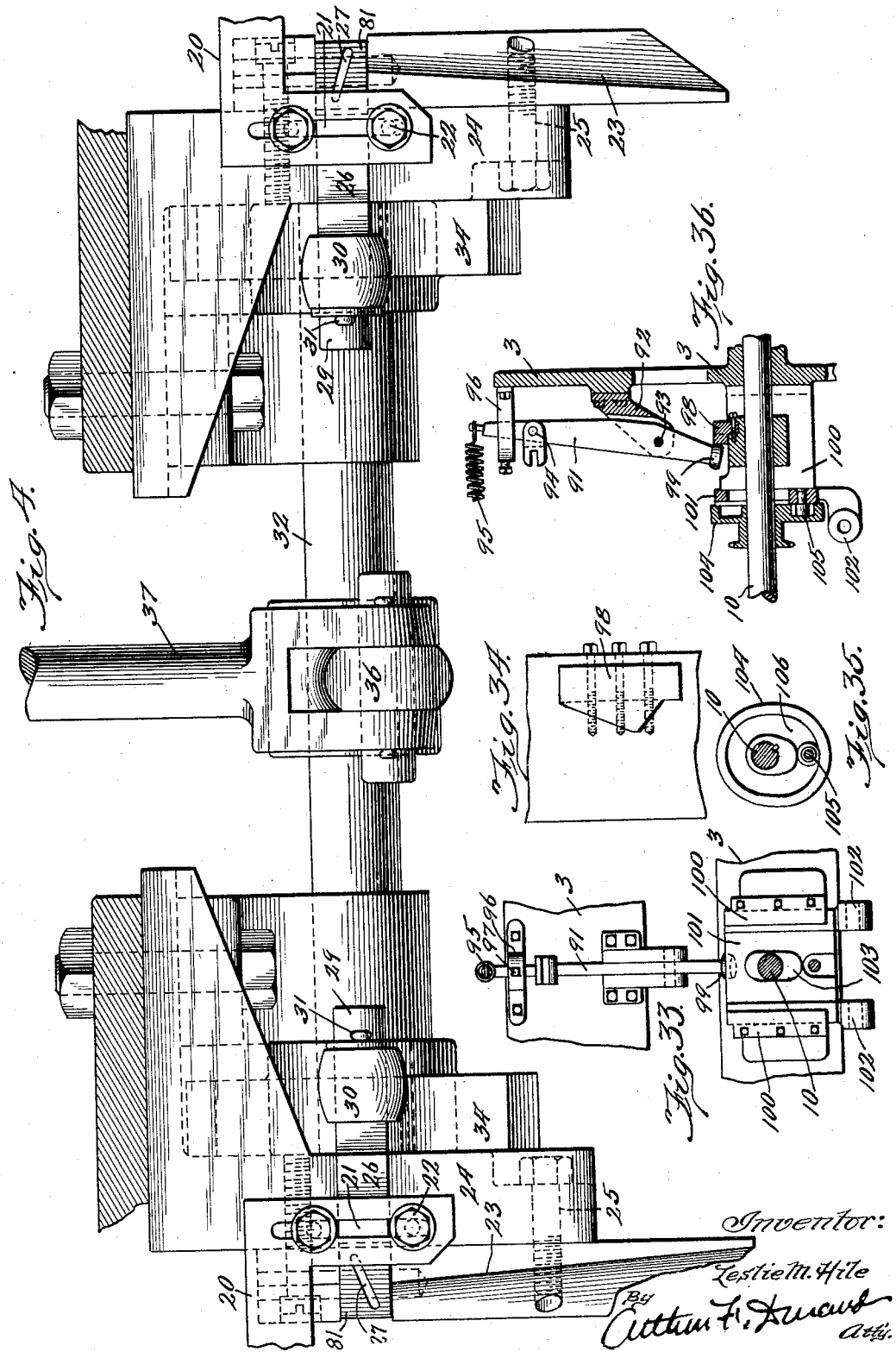

March 7, 1933. L. M. HILE 1,900,712
MACHINE FOR MAKING AND INSERTING BASKET HANDLES
Filed May 18, 1931 14 Sheets-Sheet 5
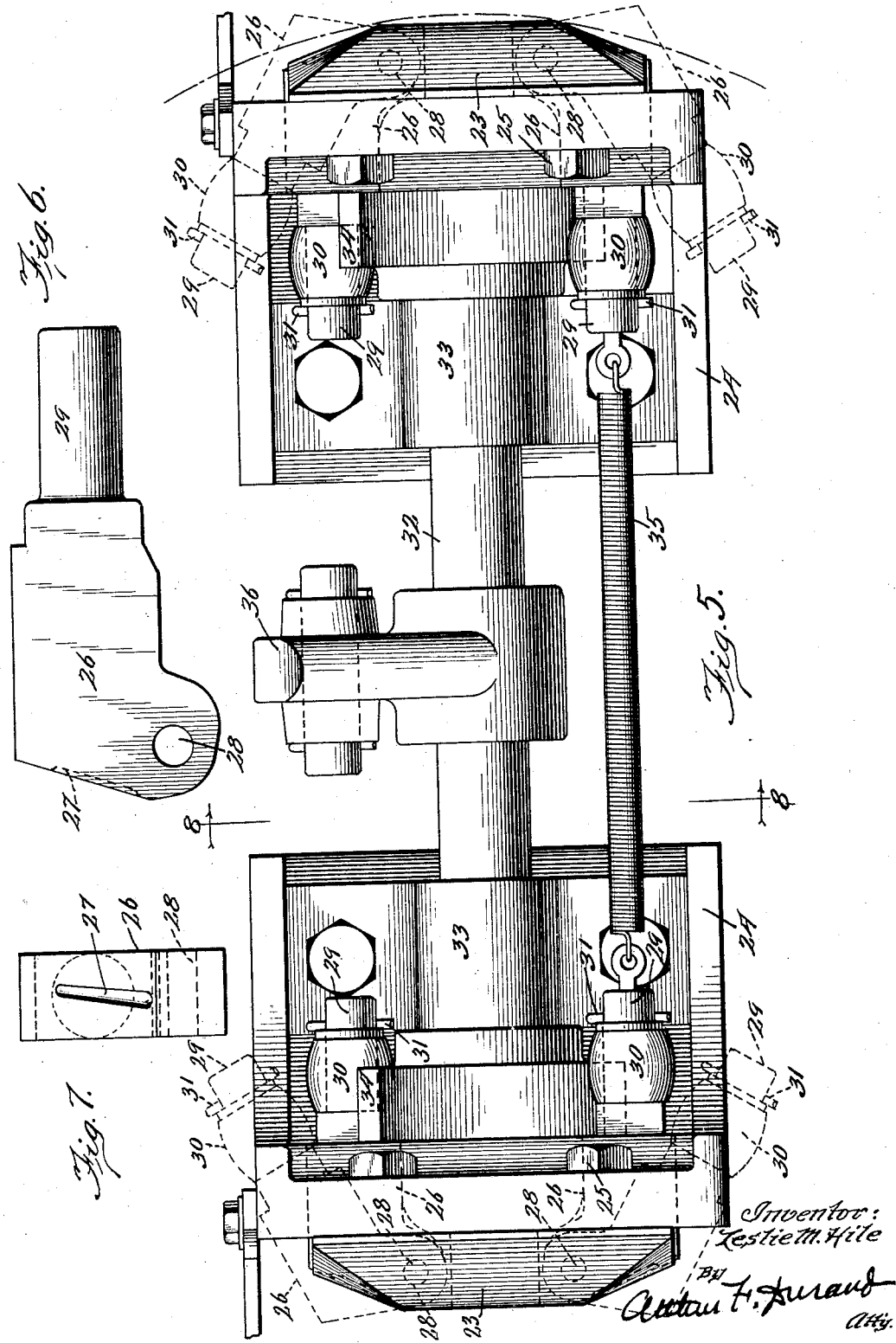

March 7, 1933. L. M. HILE 1,900,712

MACHINE FOR MAKING AND INSERTING BASKET HANDLES

Filed May 18, 1931 14 Sheets-Sheet 6

Inventor:
Leslie M. Hile
By Arthur F. Durant
Atty.

March 7, 1933. L. M. HILE 1,900,712
MACHINE FOR MAKING AND INSERTING BASKET HANDLES
Filed May 18, 1931  14 Sheets-Sheet 7

Inventor:
Leslie M. Hile
By Arthur F. Durand
Atty.

March 7, 1933. L. M. HILE 1,900,712
MACHINE FOR MAKING AND INSERTING BASKET HANDLES
Filed May 18, 1931 14 Sheets-Sheet 8
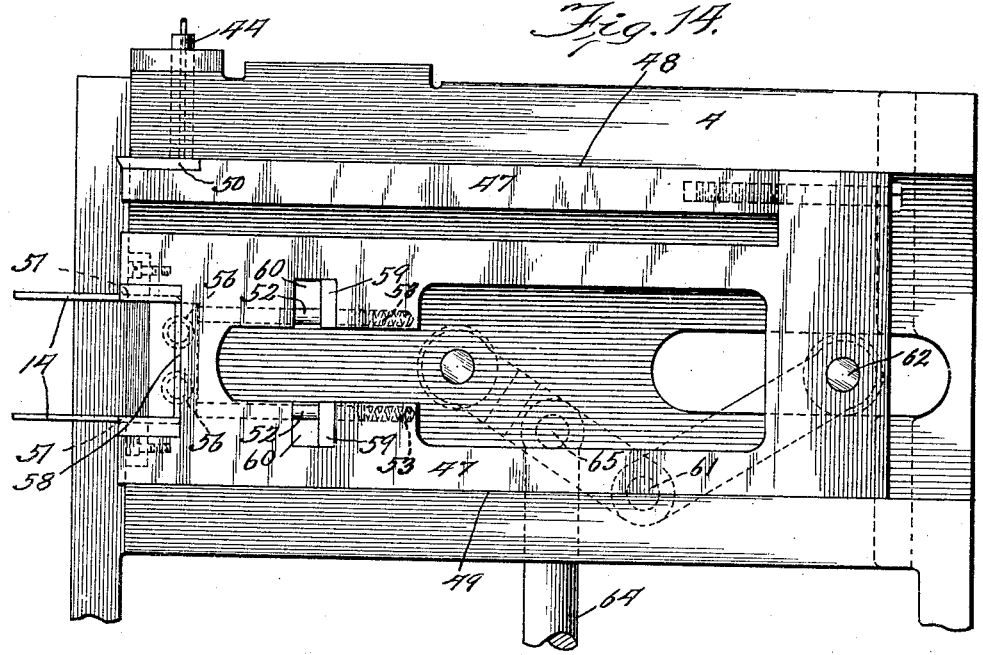
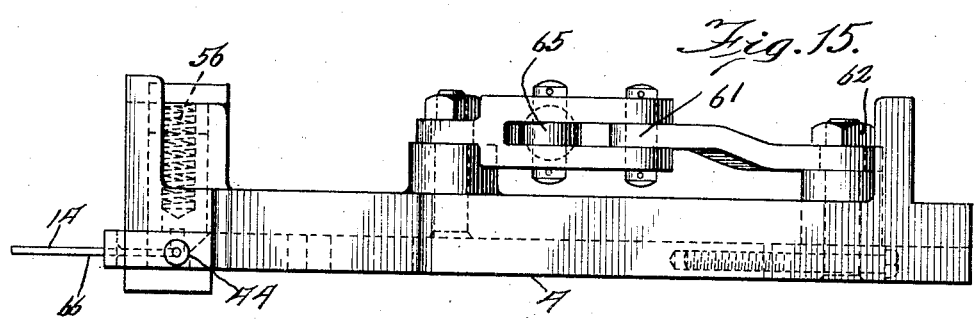
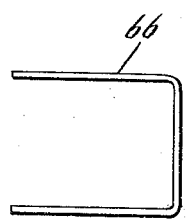
Inventor:
Leslie M. Hile
By Arthur F. Durand
Atty.

March 7, 1933.　　　L. M. HILE　　　1,900,712
MACHINE FOR MAKING AND INSERTING BASKET HANDLES
Filed May 18, 1931　　　14 Sheets-Sheet 9
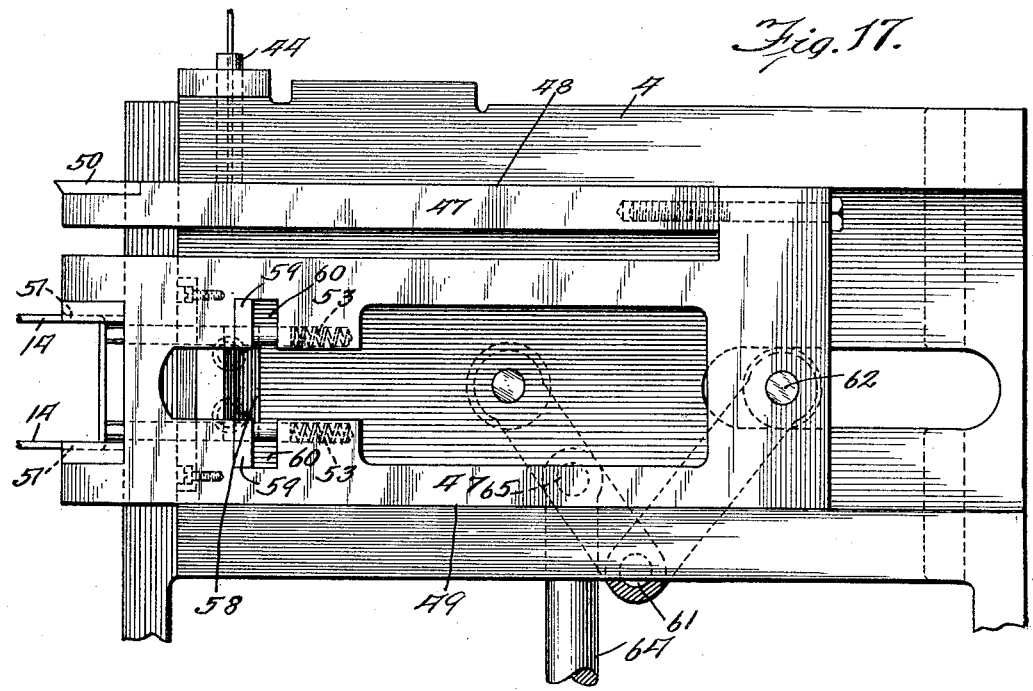
Fig. 17.
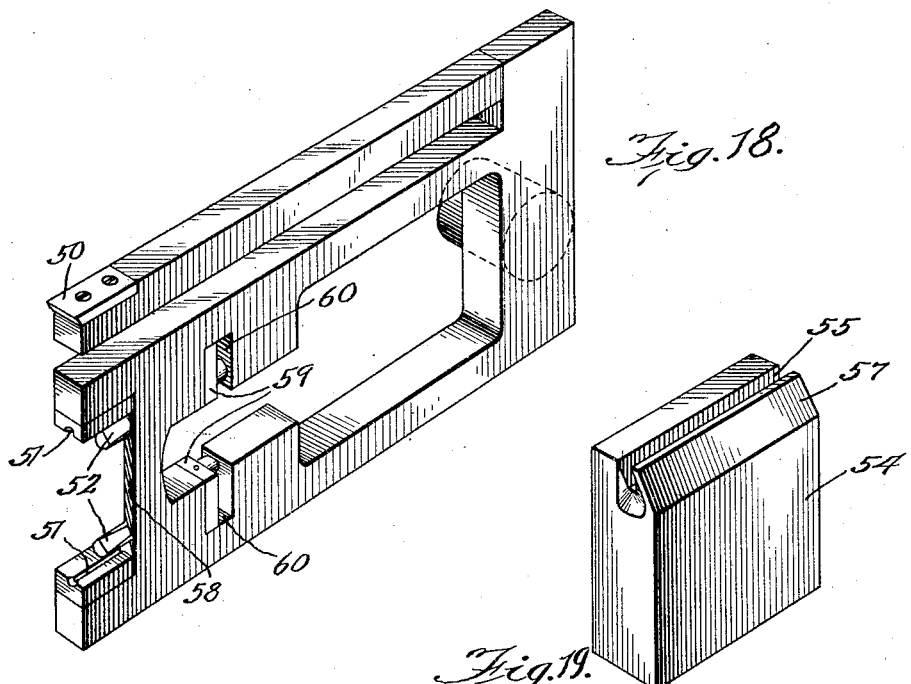
Fig. 18.
Fig. 19.
Inventor:
Leslie M. Hile
By Arthur F. Durand
Atty.

March 7, 1933. L. M. HILE 1,900,712
MACHINE FOR MAKING AND INSERTING BASKET HANDLES
Filed May 18, 1931 14 Sheets-Sheet 10
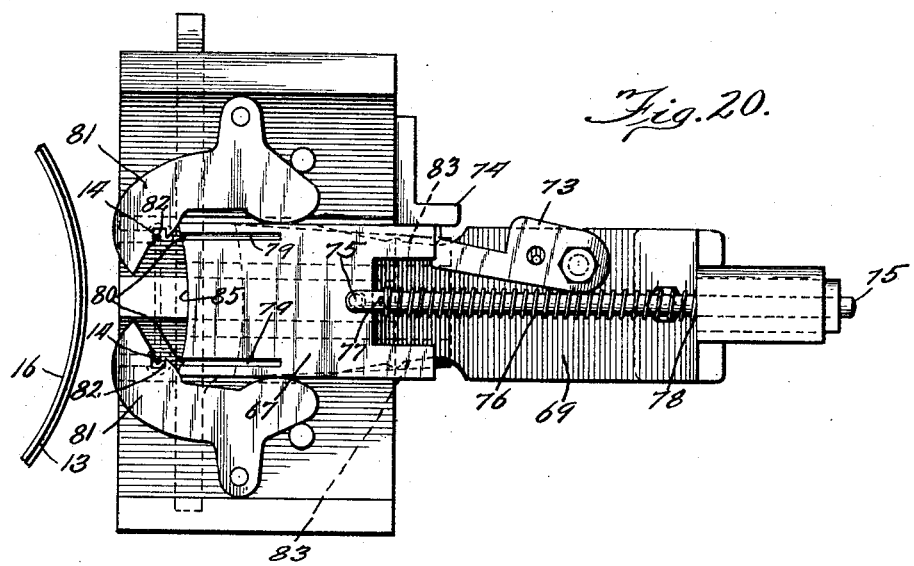
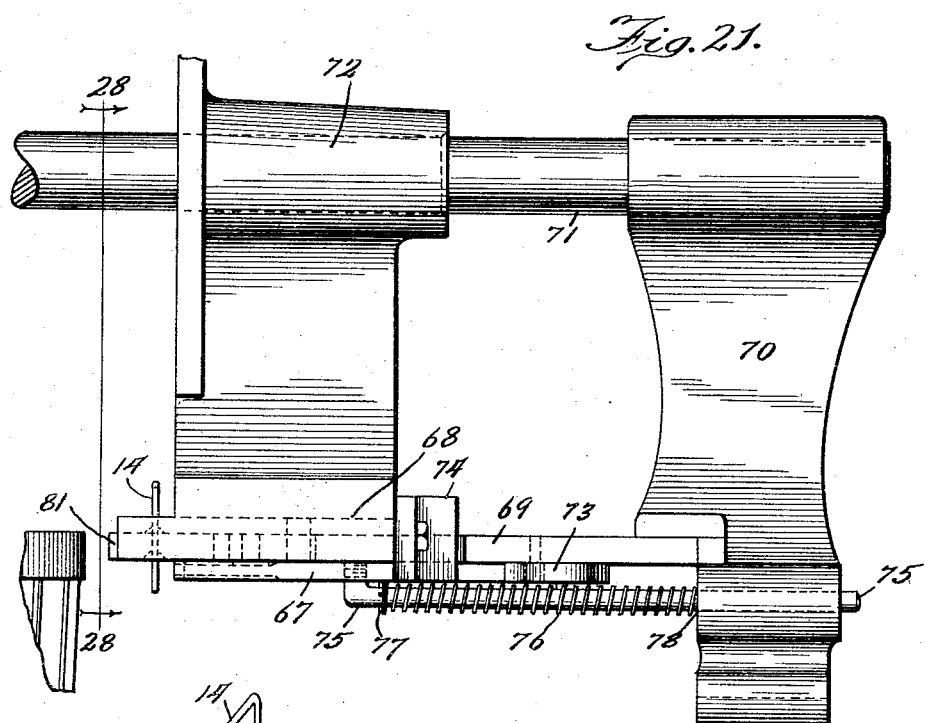
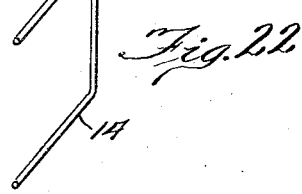
Inventor:
Leslie M. Hile
By Arthur F. Durand
Atty.

March 7, 1933.   L. M. HILE   1,900,712
MACHINE FOR MAKING AND INSERTING BASKET HANDLES
Filed May 18, 1931   14 Sheets-Sheet 11

Inventor:
Leslie M. Hile
By Arthur F. Durand
Atty.

March 7, 1933.  L. M. HILE  1,900,712
MACHINE FOR MAKING AND INSERTING BASKET HANDLES
Filed May 18, 1931  14 Sheets-Sheet 12

Inventor:
Leslie M. Hile
By Arthur F. Durand
Atty.

March 7, 1933.  L. M. HILE  1,900,712
MACHINE FOR MAKING AND INSERTING BASKET HANDLES
Filed May 18, 1931   14 Sheets-Sheet 13

Inventor:
Leslie M. Hile
By Arthur F. Durand
Atty.

March 7, 1933.   L. M. HILE   1,900,712
MACHINE FOR MAKING AND INSERTING BASKET HANDLES
Filed May 18, 1931   14 Sheets-Sheet 14

Inventor:
Leslie M. Hile
By Arthur F. Durand
Atty.

Patented Mar. 7, 1933

1,900,712

UNITED STATES PATENT OFFICE

LESLIE M. HILE, OF BENTON HARBOR, MICHIGAN

MACHINE FOR MAKING AND INSERTING BASKET HANDLES

Application filed May 18, 1931. Serial No. 538,155.

This invention relates to machinery for making and inserting wire handles in baskets, such as bushel or half bushel baskets, and other receptacles of a similar nature.

Generally stated, the object of the invention is to provide a novel and improved construction and arrangement whereby the two opposite handles of a basket or other receptacle may be made and inserted at the same time, by means of clincher mechanism having cam actuated clinch blocks, which mechanism with the cams thereof is mounted in position to operate within the basket, so that the two handles are simultaneously made and inserted, whereby it is not necessary to change the position of the basket after it is once inserted in the machine, as is necessary in machines that insert only one handle at a time.

It is also an object to provide certain details and features of construction and combinations tending to increase the general efficiency and the desirability of a basket handling machine of this particular character.

To these and other useful ends, the invention consists in matters hereinafter set forth and claimed and shown in the accompanying drawings, in which—

Fig. 4 is an enlarged horizontal detail section on line 4—4 of Fig. 3 of the drawings;

Fig. 5 is a front elevation of the parts shown in Fig. 4 of the drawings;

Fig. 6 is an enlarged detail view of one of the parts for bending the wire of the handles;

Fig. 7 is an end view of the part shown in Fig. 6 of the drawings;

Fig. 14 is a view similar to Fig. 10, showing the parts in different positions, the wire having been bent into bail form;

Fig. 15 is a view looking down on the mechanism as shown in Fig. 14 of the drawings;

Fig. 16 shows the bail-shaped bent section of wire;

Fig. 17 is a view similar to Fig. 14, showing the parts in different positions, the bail-shaped bent section of wire having been pushed forward a distance;

Fig. 18 is a perspective of the wire bending and expelling portions of the mechanism shown in Fig. 17 of the drawings;

Fig. 19 is a perspective of the loop bar or member over which the wire is bent into bail form;

Fig. 20 is a side elevation, on a larger scale, of the mechanism shown at the right in Fig. 1 of the drawings, for bending the end portions of the bail-shaped section of wire, preliminary to inserting these ends through the rim of the basket;

Fig. 21 is a view looking down on the parts shown in Fig. 20 of the drawings;

Fig. 22 is a perspective of the bail-shaped bent section of the wire preparatory to the bending of the end portions thereof at right angles to the two legs or sides of the bail-formed handle;

Figs. 33, 34, 35 and 36 are detail, fragmentary, sectional views, showing some of the instrumentalities on the driving shaft below, for operating certain devices above.

Figure 1:
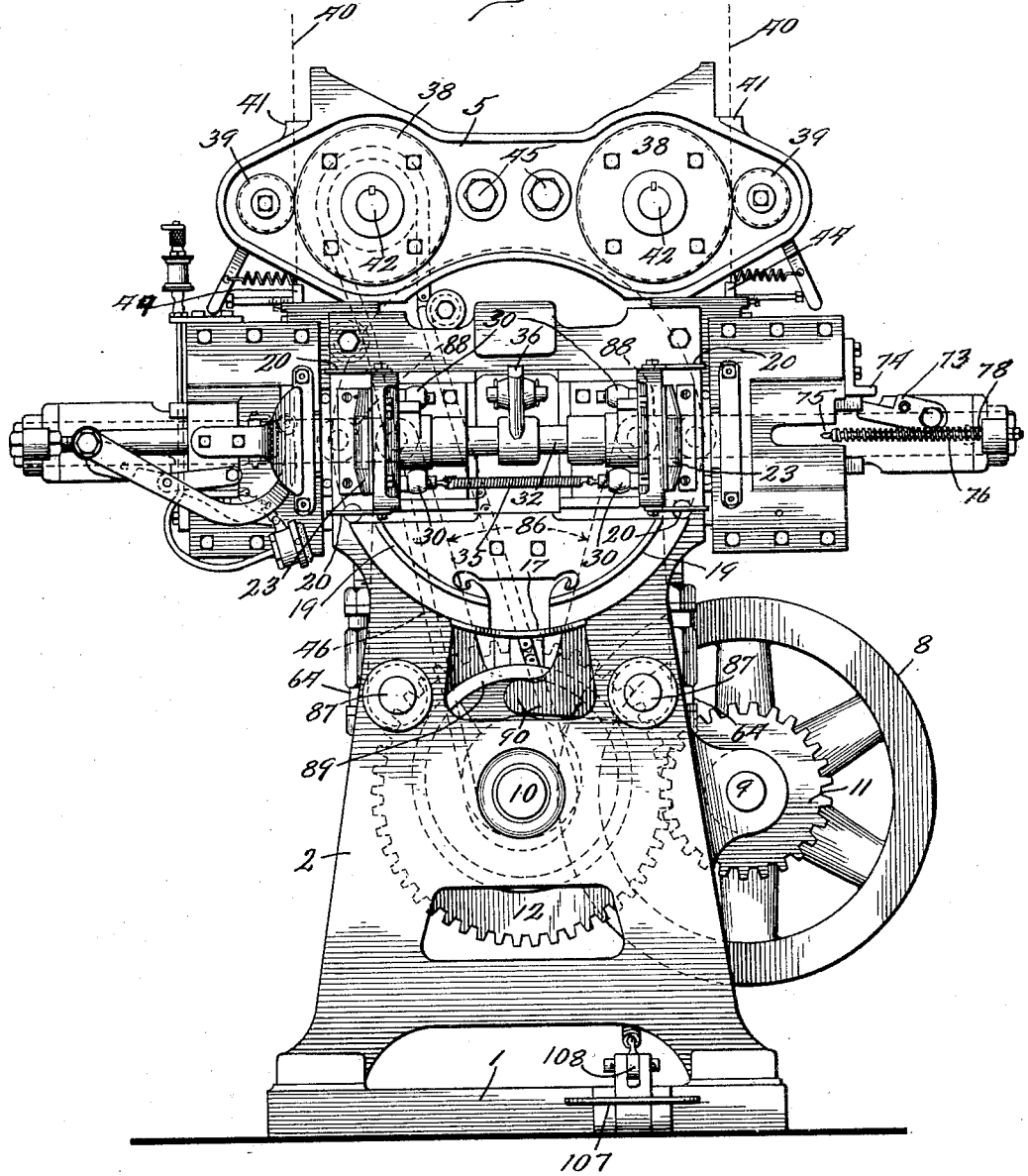
Fig. 1 is a front elevation of a basket handling machine embodying the principles of the invention.

As thus illustrated, the invention comprises a base 1 upon which the front and rear upright frame members 2 and 3 are mounted and arranged in the manner shown. Side plates 4 are secured to said upright front and rear frame members, being spaced apart to provide a sort of well or space in the upper portion of the body frame, for the instrumentalities hereinafter described. A top casting 5 is secured to the upper part of the body frame, at the front thereof, and castings 6 are secured to the sides of the body frame, in the plane of the horizontal axis of the basket, when the latter is in position to have the handles secured thereto. Front plates 7 are secured to the castings 6, in the same vertical transverse plane.

Power is communicated to the pulley 8, in any suitable manner, which pulley is mounted on the shaft 9, supported in suitable bearings on the frame of the machine. A horizontal jack shaft 10 is mounted to rotate in bearings on the front and rear frame members 2 and 3, this shaft being preferably located directly below the said horizontal axis of the basket, when the latter is in position to have the handles fastened thereto, the position of the basket at such time being indicated by the dotted lines in Fig. 3 of the drawings. A pinion 11 on the shaft 9 is arranged to engage the gear wheel 12 on the shaft 10, and it is from the latter that the various operating parts of the machine, arranged above, are driven or operated.

Figure 2:
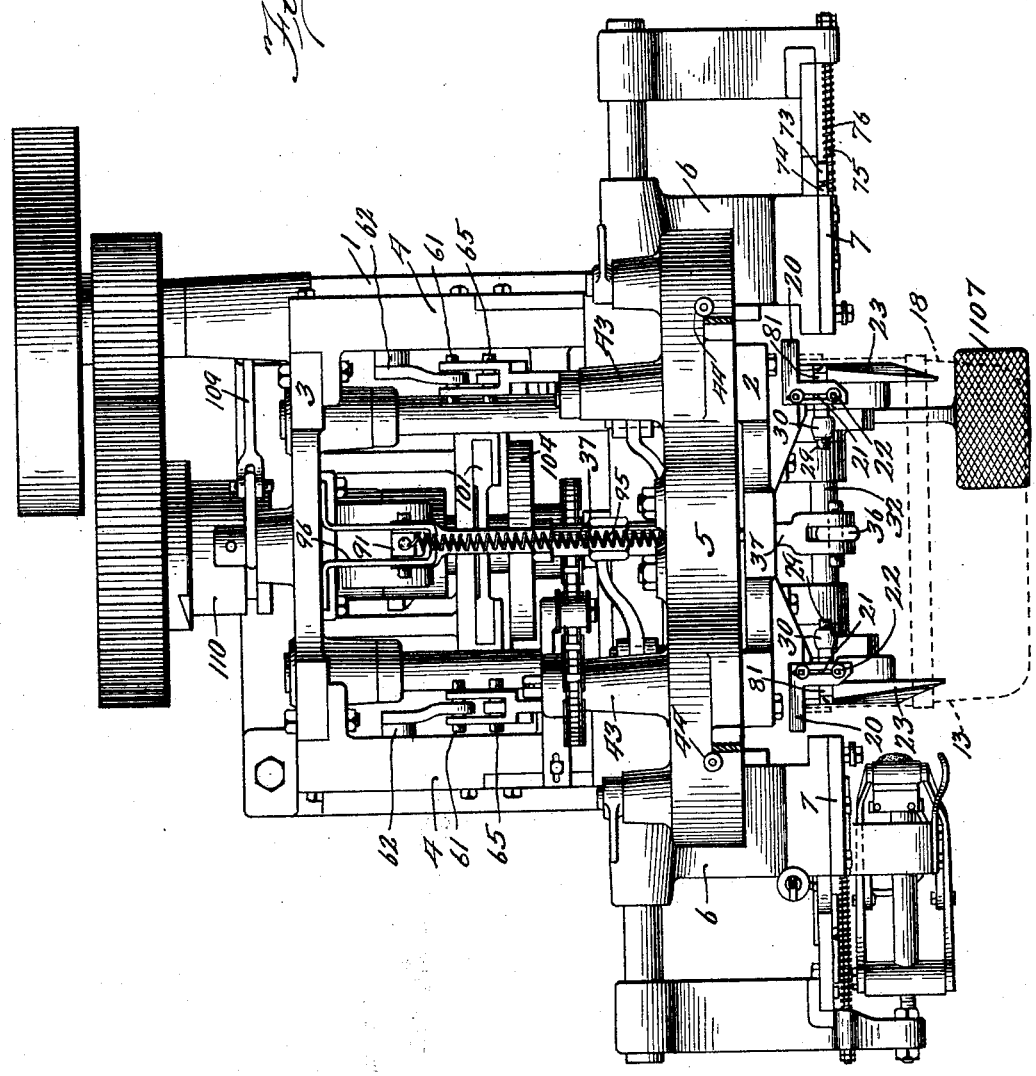
Fig. 2 is a plan view of said machine.
Figure 3:
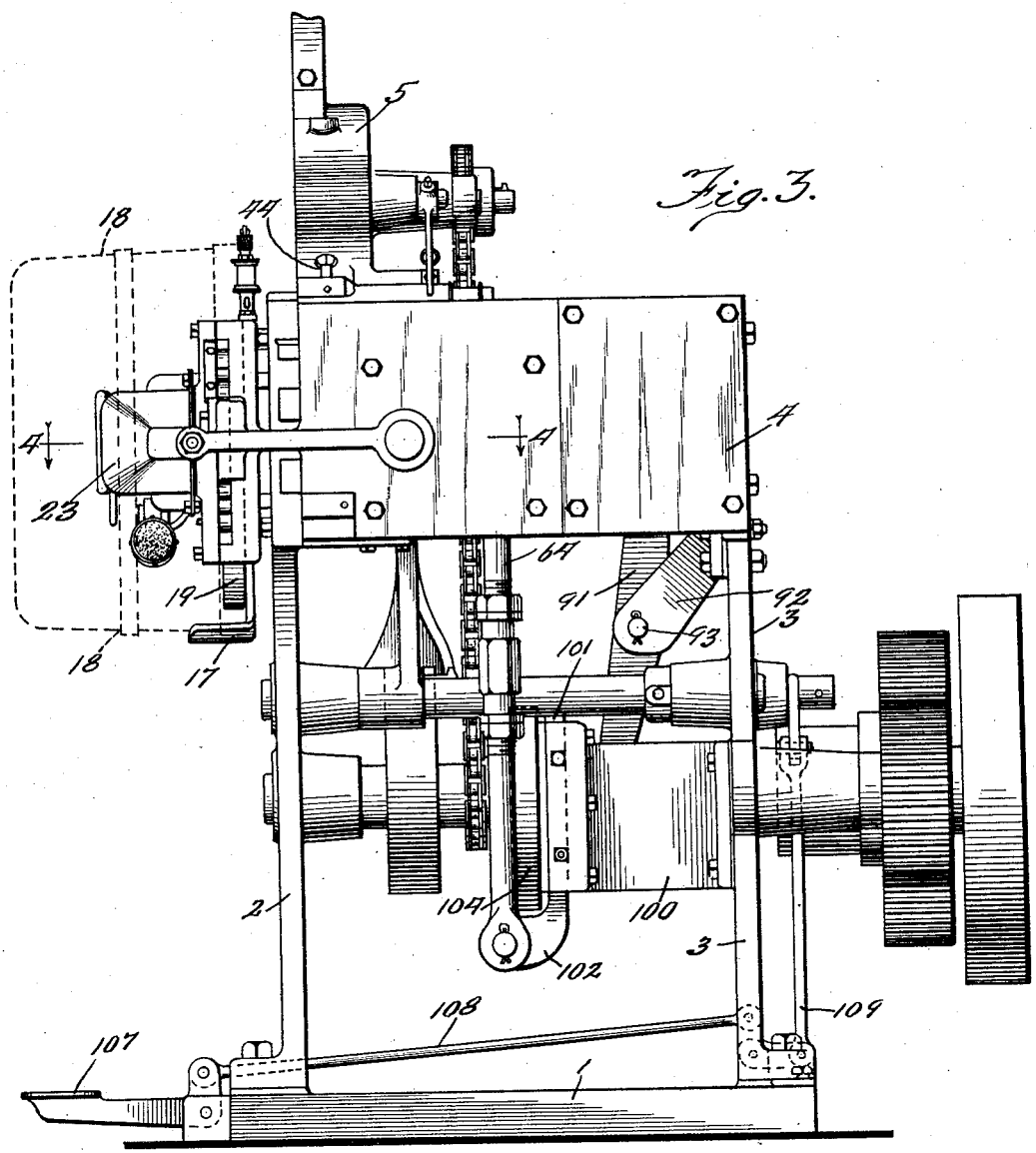
Fig. 3 is a side elevation of said machine.
Figure 8:
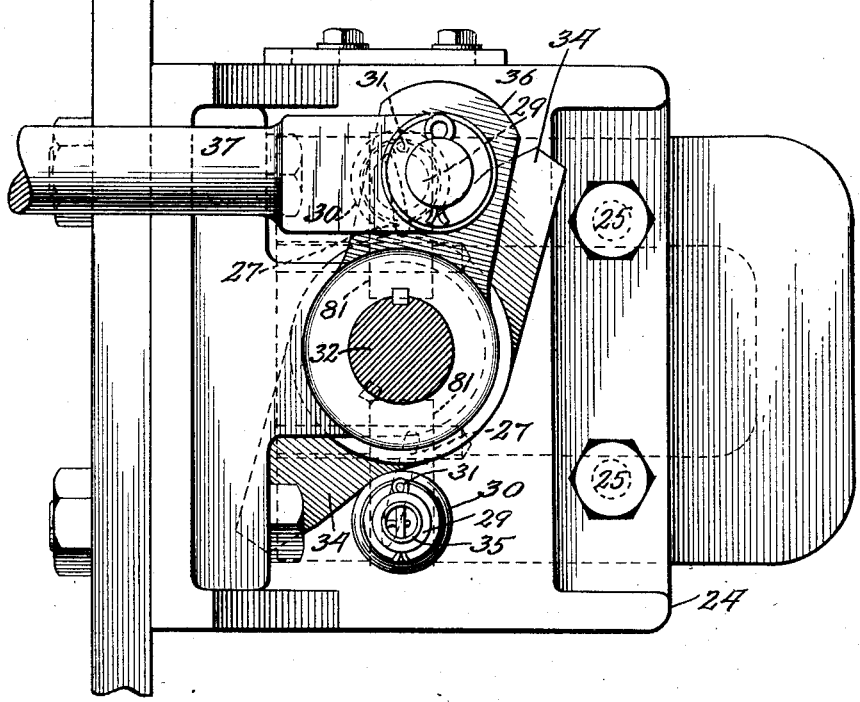
Fig. 8 is a detail vertical section on line 8—8 in Fig. 5 of the drawings.
Figure 9:
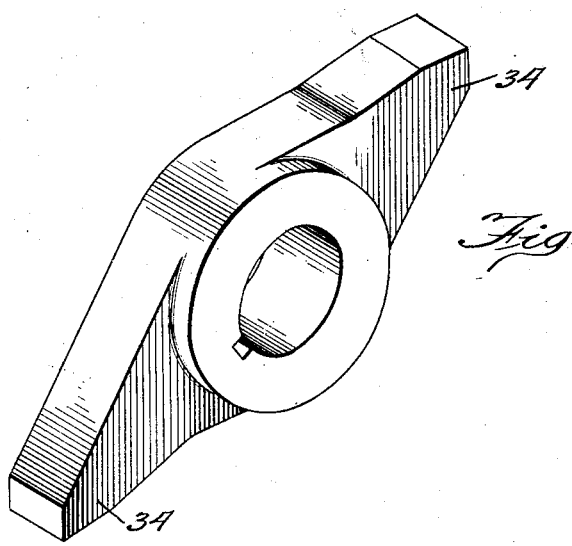
Fig. 9 is a perspective view of one of the parts shown in Fig. 8 of the drawings.
Figure 10:
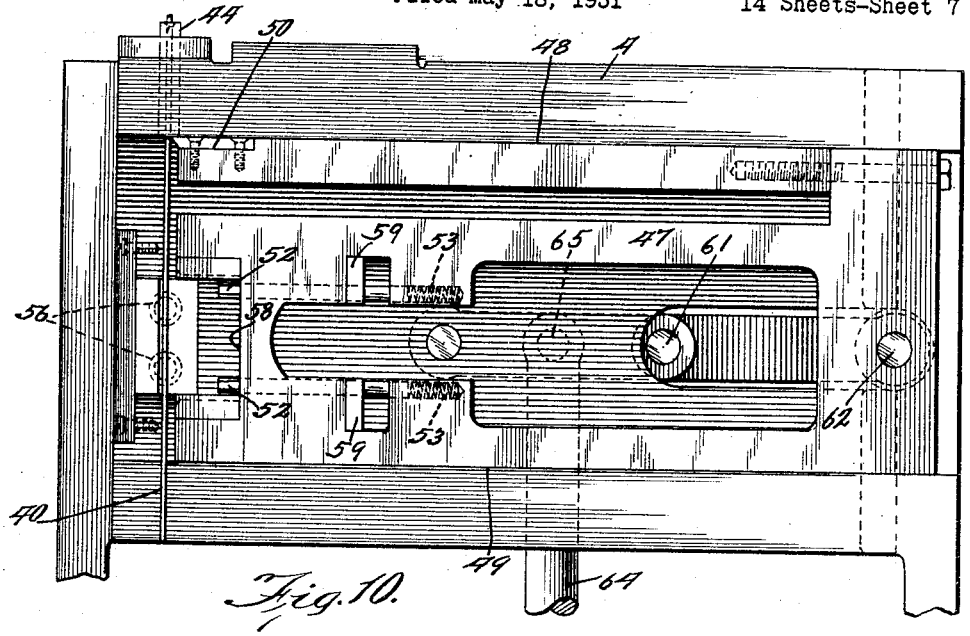
Fig. 10 is an enlarged side elevation of the mechanism which cuts off the wire and bends it into bail shape, preliminary to the insertion of the legs of the bail through the rim of the basket.
Figure 11:
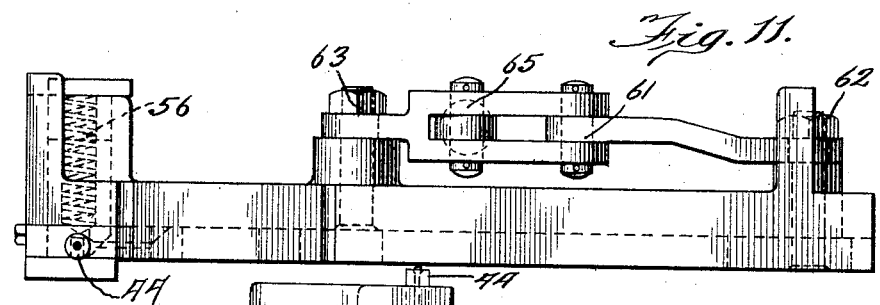
Fig. 11 is a view looking down on the mechanism shown in Fig. 10 of the drawings.
Figures 12, 13:
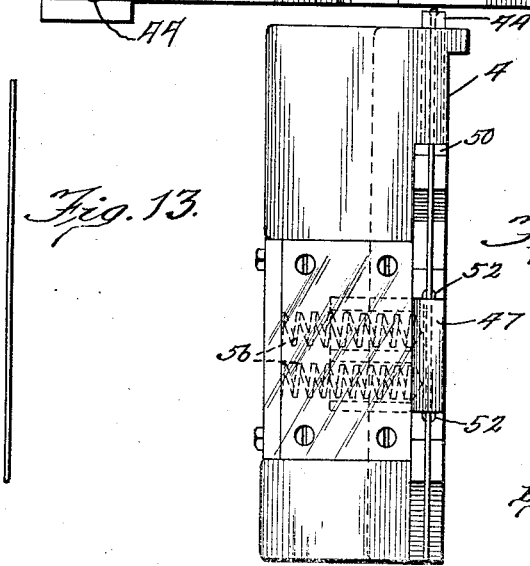
Fig. 12 is an end view of the mechanism shown in Fig. 11 of the drawings.
Fig. 13 shows the straight length of wire which is first cut off by the mechanism.
Figure 23:
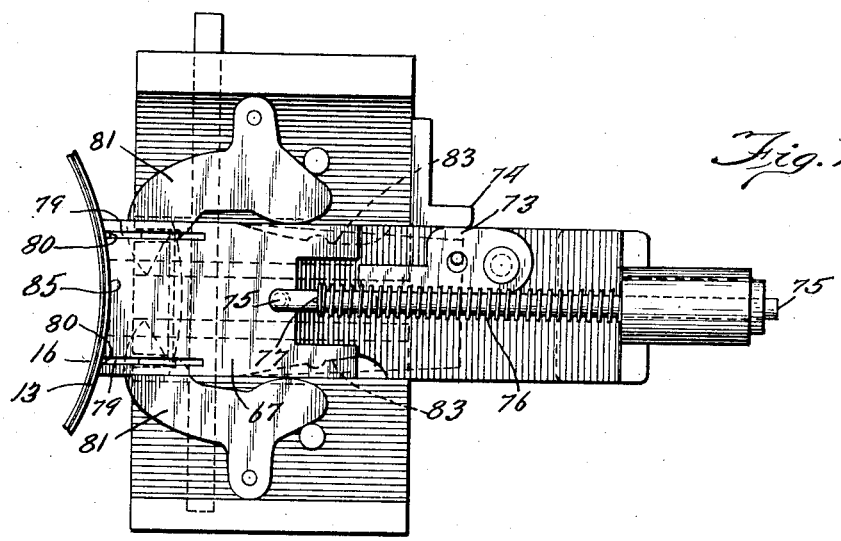
Fig. 23 is a view similar to Fig. 20 of the drawings, showing the parts in different positions.
Figure 24:
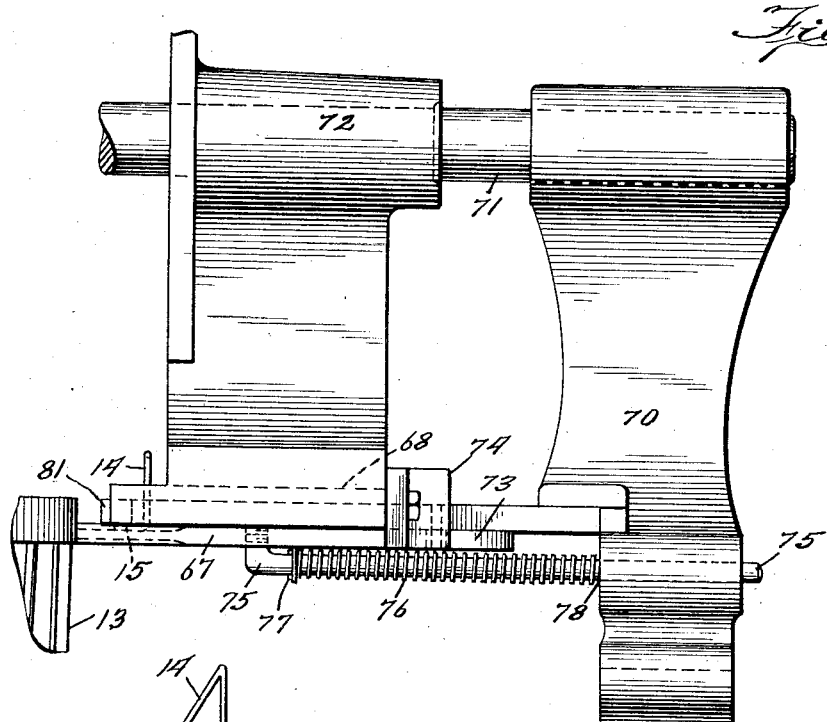
Fig. 24 is a view looking down on the parts, as shown in Fig. 23 of the drawings.
Figure 25:
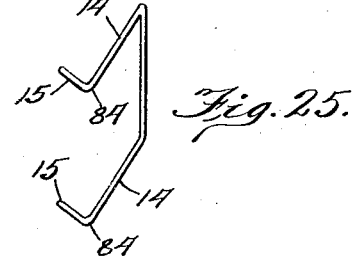
Fig. 25 is a perspective of the bail-shaped handle with its ends bent at right angles, preliminary to the insertion of these bent end portions through the rim of the basket.
Figure 26:
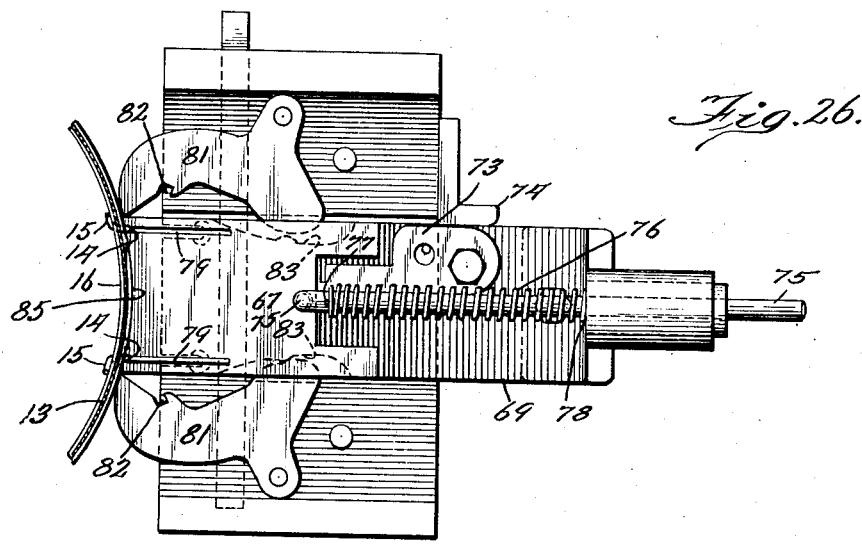
Fig. 26 is a view similar to Fig. 23, showing the parts in different positions, the handle having been fully inserted in the basket.
Figure 27:
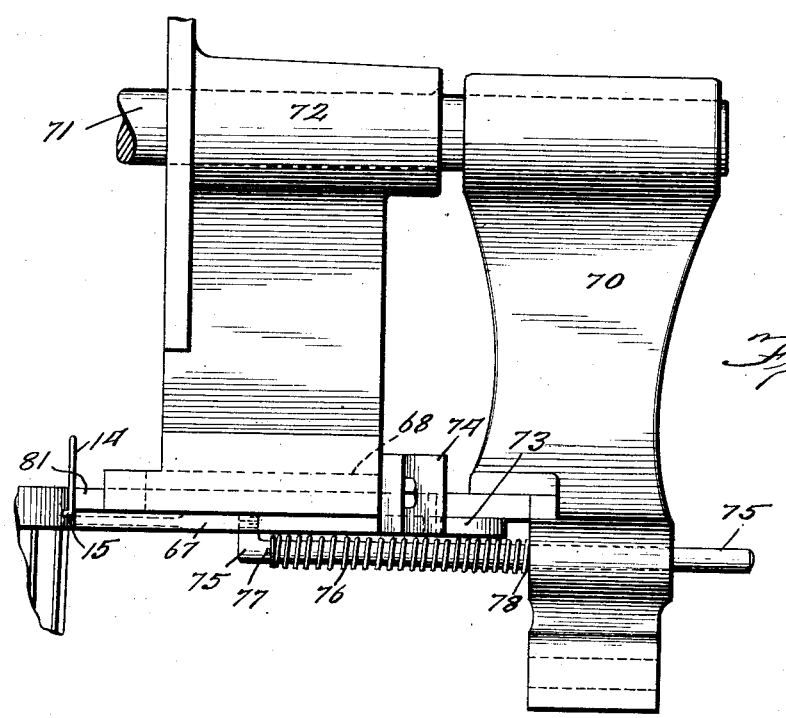
Fig. 27 is a view looking down on the parts, as shown in Fig. 26 of the drawings.
Figure 28:
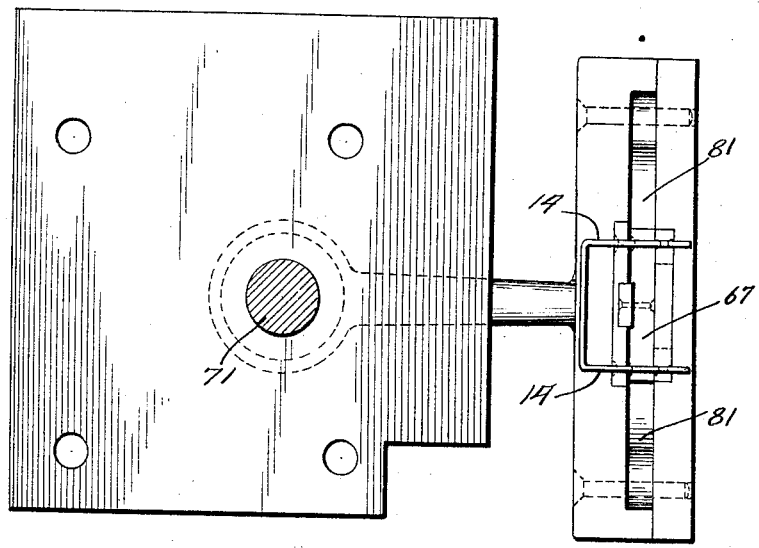
Fig. 28 is a vertical section on line 28—28 in Fig. 21 of the drawings.
Figure 29:
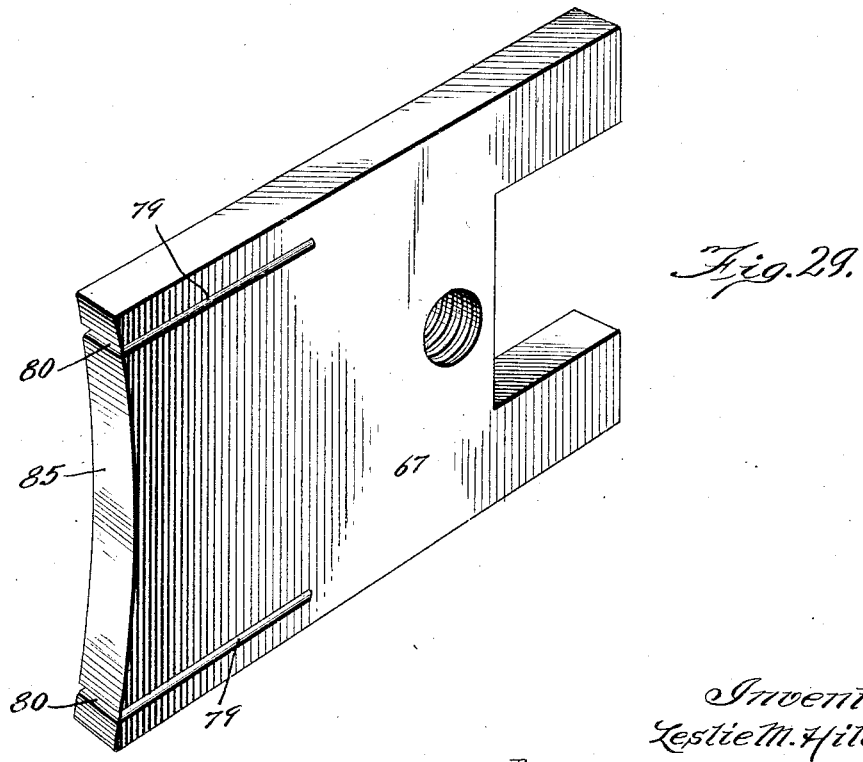
Fig. 29 is a perspective of one of the forming elements shown in Figs. 20 to 28 of the drawings, on a larger scale.

Before describing the instrumentalities for forming and inserting the wire handles in the basket, a brief description of the basket, and of the form of the handles secured thereto, is desirable in connection with Figs. 22, 25, 30, 31 and 32 of the drawings, as follows:

As will hereinafter more fully appear, each handle is formed from a length of wire, first cut into a straight length, and then formed into a U-shaped wire member, as shown in Fig. 22 of the drawings. These two members are then moved into parallel planes at opposite sides of the basket, so that the end portions of the two U-shaped members are parallel with, and adjacent, the opposite sides of the outer top hoop 13 of the basket. Thereafter, as will hereinafter more fully appear, the said end portions are bent at right angles to the legs 14 of the U-shaped member, as shown in Fig. 25 of the drawings, so that parallel end portions 15 are provided, as shown. The two U-shaped handle members are then moved toward each other, at opposite sides of the basket, until the portions 15 are inserted through the said outer hoop and the inner hoop 16 of the basket, and at the same time the end portions 15 are bent back against the inner hoop of the basket, so that these portions will not be parallel with the leg portions 14 of each handle, but, to the contrary, will extend outwardly or away from each other, as shown in Fig. 31 of the drawings, in which latter the two end portions 15 are oblique, or extend slightly crosswise of the inner hoop. Or, the portions 15 may be bent into the same horizontal plane, as shown in Fig. 32 of the drawings, so that these portions 15 will be in the plane parallel with, and immediately below, the horizontal plane of the upper edges of the two top hoops of the basket. When the handles are thus attached, as shown, for example, in Fig. 30 of the drawings, it will be seen that each handle is free to be bent outwardly away from the outer top hoop of the basket, in the manipulation of these handles to fasten the cover in place, and are then free to be bent back into vertical position in the manner necessary and well understood in the securing of the ordinary top cover in place on the top of the basket. However, inasmuch as the portions 15 are bent outwardly, instead of directly upwardly, it follows that any distortion of the portions of the handles which are inserted through the hoops, by such manipulation of the handles, will not have a tendency to rock the portions 15 away from the inner hoop, or at least not as much as would be the case if these portions 15 were bent directly upward in vertical position. There might be some slight inward displacement of the portions 15 in Fig. 31 of the drawings, as the portions 15 are bent upwardly a slight distance, but with the construction shown in Fig. 32 of the drawings, the portions 15, being exactly horizontal, would not experience any inward displacement away from the inner hoop of the basket, when the top portion of the handle is bent back into normal position. In this way, basket handles are produced, on bushel or half-bushel baskets, that can be bent outwardly and then back again, for any purpose whatsoever, as in attaching the cover, without injuring the fruit or other contents of the basket, and instrumentalities for forming these handles from straight lengths of wire, automatically cut off from wire fed from reels, and for bending the wire and inserting it through the upper rim of each basket, and for bending and clinching the inner end portions of the handles in the desired manner, are as follows:

In the first place, the means for receiving and holding the basket in position, with its top or mouth facing the front of the machine, and with its axis horizontal and extending front and rear of the machine, include a rigid support 17 for the lower side of the basket, suitably secured to the front portion of the frame of the machine, in position to extend under the lower side of the mouth or rim portion of the basket, when the latter is placed in the position shown by the dotted lines 18 in Fig. 3 of the drawings. This support 17 also has the curved portions 19 that engage the inner top hoop of the basket, the support 17 being also curved in conformity with the curvature of the top portion of the basket. Suitably mounted on the body frame, are the adjustable gauges 20, two at each side of the basket, the members of each pair being arranged immediately above and below the two positions where the handles are to be applied. These gauges are preferably L-shaped in form, as shown more clearly in Fig. 2 of the drawings, and have slots 21 through which fastening bolts 22 are inserted, as shown more clearly in Fig. 4 of the drawings, whereby these gauges can be adjusted to engage the rim of the basket, and to thereby accurately position the basket to receive the handles. In this way, the basket is accurately positioned and centered, so to speak, so that the two handles may be applied in the desired manner. In addition, inside gauge pieces or positioning portions 23 are secured in place on the body frame brackets 24, by bolts 25, these gauges 23 being shaped to slide smoothly into the interior of the basket, thereby to support the two side portions of the basket inside and against the exterior pressure of the means by which the end portions of the handles are thrust or inserted through the top hoops of the basket, in a manner that will hereinafter more fully appear.

Figure 30:
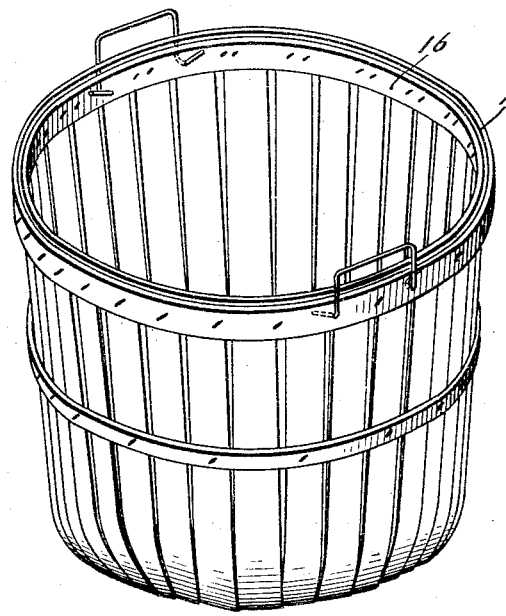
Fig. 30 is a perspective of one of the baskets provided with handles formed and inserted by said machine.
Figure 31:
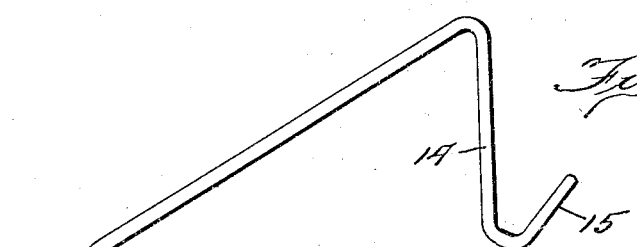
Fig. 31 is a perspective showing the handle in its completed form.
Figure 32:
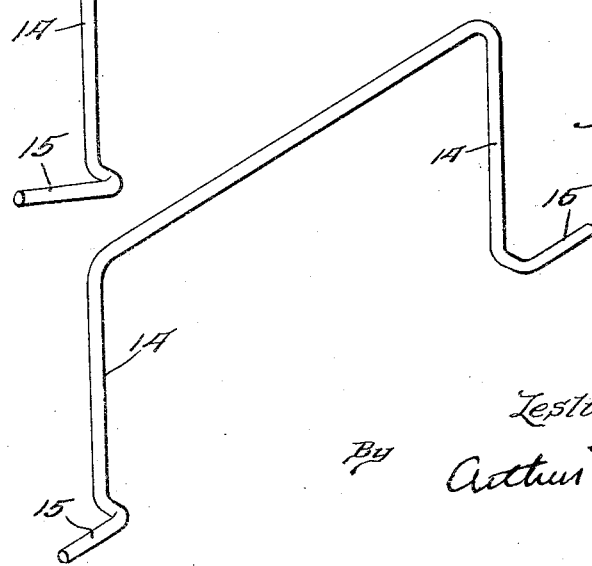
Fig. 32 is a similar view showing a modification of said handle.

To clinch the end portions 15 of the handles, upon the inner surface of the inside hoop 16, as shown in Figs. 30, 31 and 32 of the drawings, is an important feature of the invention, and will be described in advance of the description of the means for forming and inserting the handles, as follows:

The clinch blocks 26, provided with the clinching grooves 27, are pivoted at 28, upon stationary portions of the machine, and are provided with cylindrical portions 29, upon which are mounted the rollers 30, the latter being held in place by pins 31, or any other suitable means. The rock shaft 32 is mounted in bearings 33, suitably secured to the stationary bracket supports 24, and this rock shaft is provided with the cams 34 that are shaped to engage the rollers 30, whereby the clinch blocks 26 are automatically in timed relation to the other elements of the machine, rocked into the position shown in dotted lines in Fig. 5 of the drawings, thereby bending the portions 15 of the handles in the desired manner, the grooves 27 being formed and disposed at angles suitable for this purpose. The shaft 32 and its cams thus operate about an axis extending through the opposite sides of the basket rim. The weight of the rollers 30 will bring the upper clinch blocks 26 back into normal position, but the two lower clinch blocks 26 are preferably connected together by a spring 35, which serves to yieldingly keep these two lower clinch blocks in normal position. Preferably, the clinch blocks 26 are tilted far enough to bend the portions 15 in such manner that they will cling tightly to the inner surface of the inside top hoop of the basket. Any suitable means can be employed for rocking the shaft 32, at the proper time, but this is preferably done by a crank arm 36 to which a pitman 37 is connected.

In a machine of this kind, therefore, in which the two handles are made and applied simultaneously to opposite sides of a basket, to the upper rim thereof, it becomes necessary to feed two strands of wire simultaneously, from which portions are automatically cut off and formed into said handles, and for this purpose wire feed mechanism is provided as follows: Upon the casting 5, there are mounted feed rolls 38 and 39, the two rolls 38 being relatively large and being positively driven, as will hereinafter more fully appear, and the rolls 39 being smaller and being preferably idler rolls. The two strands of wire 40 are fed downwardly, in parallel relation to each other, from overhead reels (not shown) through the guides 41, formed in the upper side of the casting 5, which latter is in the nature of a housing. The rolls 38 are preferably fixed on horizontal and parallel shafts 42, disposed in the same horizontal plane, and extend parallel with the longitudinal axis of the machine, these two shafts being preferably mounted in bearings 43, formed integral with the casting 5, the latter being suitably secured to the top of the body frame of the machine. The two shafts 42 are geared together, to rotate in opposite directions, thereby to feed the wire strands 40 downwardly between each roll 38 and its co-operating idler roll 39, to the cutting tubes 44, which latter are on top of the parallel side frames or housings 4, previously mentioned. Gears (not shown) on the shafts 42, and on the studs 45, within the housing 5, serve to connect the two shafts 42 together to rotate at the same speed, but in opposite directions, thereby to feed the wire in the desired manner. The wire feed rolls thus provided can be driven in any suitable or desired manner, but, as shown, are driven by a sprocket chain 46, which extends from a sprocket on the shaft 10 to a similar sprocket on one shaft 42 above, whereby the mechanism for feeding the two strands of wire, from which the wire handles are made, is driven from the shaft 10 below.

The devices for cutting off the wire 40, into lengths suitable for being bent into wire handles, is shown in Figs. 10 to 19, inclusive. As thus illustrated, each side frame 4 comprises a reciprocating cutter and handle former 47, in the form of a substantially flat plate disposed in a vertical plane and arranged to slide back and forth horizontally between the guides 48 and 49, across the path of the downwardly fed wire 40, as shown. The said reciprocating handle former has a wire cutter 50 for cutting off the proper length of wire, when the handle former moves forward. The said handle former is provided with a bifurcated end portion having the grooves 51, and adjacent these grooves are the parallel pins 52 that are backed by springs 53, so that these pins may slide endwise in the handle former. A block 54 is slidable horizontally, in a plane at right angles to the plane of the handle former, in the path of the latter, this block having a slot 55, one side of which serves as an anvil upon which the wire is bent, by the bifurcated end of the handle former, and by the grooves 51, in the manner shown in the drawings. Block 54 is backed by springs 56. This block has a bevel 57 for engagement with the throat or edge 58 of the handle former, whereby the forward motion of the handle former will force block 54 back out of the way, and the pins 52, having been slightly retracted against their springs 53, will then partially eject the partially bent handle, as shown in Fig. 17 of the drawings, the handle at this time being simply bail-shaped, with entirely straight legs and a straight transverse end portion, as shown in Fig. 16 of the drawings. The blocks 59 are fastened to the pins 52, to slide back and forth in the notches 60, thereby to keep the pins 52 from rotating. When the handle former 47 moves backward, the block 54 is restored to its normal position, in readiness to have another length of wire fed down in its notch 55, so that upon the next forward movement of the handle former, this length will be cut off and bent, as previously explained. The handle former 47 is reciprocated by a toggle connection 61, pivoted thereon at 62, and pivoted on the side frame 4 at 63, a vertically disposed rod 64 being pivoted at 65 on said toggle, whereby a downward pull on said rod 64 will operate the toggle and cause the handle former 47 to move forward, as shown in Figs. 14 and 17 of the drawings. Thus, mechanism is provided for forming a bail-shaped wire member 66, as shown in Fig. 16 of the drawings, preliminary to the bending of the ends of this member at right angles, and the insertion thereafter of these bent ends through the upper hoops of the basket. It will be understood that the parts described are duplicated at opposite sides of the machine, in the side frames or housings 4, whereby the two bail-shaped handle blanks, so to speak, will be formed simultaneously.

The mechanism for now bending the end portions of the bail-shaped wire blank at right angles, the end portions 15, as shown in Fig. 25 of the drawings, is shown in Figs. 20 to 29, inclusive. As thus illustrated, the mechanism for bending the ends of the bail-shaped wire handle blank, and inserting these parallel ends through the upper hoops of the basket, comprises, at each side of the machine, within the housings 6, a secondary former plate 67, slidable horizontally in a stationary guide housing 68, in combination with a driver plate 69, which is rigid with the head or casting 70 on the end of the horizontally and transversely arranged reciprocating rod 71, which latter reciprocates in the bearing 72, rigid with the body frame of the machine. The secondary former 67 and the driver 69 have relative sliding connection, but are normally locked together by the latch 73, as shown in Fig. 20 of the drawings. A stationary cam 74 is provided to engage the said latch 73, at the proper time, to unlock the driver 69 from the secondary former 67, the secondary former having a rod 75 with a coil spring 76 thereon, this spring being arranged for compression between the shoulder 77 on the rod and the shoulder 78 on the bracket head 70, previously mentioned. The secondary former plate 67 is provided at each side thereof with grooves 79, to engage the wire end portions 15, after the latter are bent at right angles by the notches 80 at the end of the secondary former plate, and with this construction the said secondary former 67 can be reversed, or turned side for side, when it becomes worn on one side. Two pivoted anvils 81 are provided, with notches 82 to receive the straight end portions of the wire handle blank, in alignment with the horizontal grooves 79, as shown in Fig. 20 of the drawings. While the secondary former 67 is moving forward, to bend the wire ends 15 at right angles, preliminary to their insertion through the hoops of the basket, the pivoted anvils 81 are held in operative position by the upper and lower edges of the driver 69, but these edges are cut away at 83, so that the forward end of the driver 69 may push the anvils out of the way, and tilt them into the position shown in Fig. 26 of the drawings, in order that the end of the driver 69 may engage the elbows 84 of the wire, when bent into the condition shown in Fig. 25 of the drawings, whereby the end of the driver 69 may be unimpeded and may be free to exert pressure on the elbow portions 84 to insert the portions 15 through the hoops of the basket. At such time, the curved end edge 85 of the secondary former 67 will bear against the curved outer hoop of the basket, and the groove 79 will form guides in which the portions 15 will slide while being inserted through the hoops of the basket. When the mechanism is retracted, the latch 73 will be automatically brought into latching position, by a spring (not shown), thereby to again lock the secondary former 67 and the driver 69 rigidly together; and, at such time, the anvils 81 will be restored to their normal positions. Each housing 6 has a front plate, it will be seen, to cover the forming and driving elements here described. The means for operating the rods 71 may be of any suitable character, but, as shown, include pivoted rocker arms 86, mounted to rock on the pivots 87, supported by the body frame, and having their upper ends connected by pivoted links 88 with the said rods 71, as shown. A cam 89 on the shaft 10 engages the bell-crank ends 90 of the two rocker arms 86, whereby rotation of this cam serves to rock the arms 86 and thereby cause reciprocation of the rods 71 in unison, whereby the two bail-shaped handle blanks are simultaneously bent and inserted through the upper hoops of the basket. It will now be seen that the result of such insertion is as described in connection with the clinching mechanism shown in Figs. 4 to 9, inclusive, whereby the end portions 15 of the handles are deflected back against the inner hoop of the basket, either at angles, as shown in Fig. 31, or in a horizontal plane, as shown in Fig. 32 of the drawings. Thus, the different steps through which the handles pass are as follows: First, the wire is cut off into the desired length; then the wire is bent into bail shape, with the two bail-shaped wire handle blanks in parallel planes at opposite sides of the basket; then these two bail-shaped handle blanks are moved forward a distance, in the planes thereof, in order to bring the end portions of the wire in position to be properly bent; then the end portions of the two bail-shaped wire handle blanks are bent at right angles, so that they are all parallel and in the same vertical plane extending transversely of the machine, which plane is the plane in which the two top hoops of the basket are at such time located; and finally, as the said end portions of the wire are inserted through the hoops of the basket, these end portions are deflected and bent by the mechanism shown in Figs. 4 to 9 of the drawings, as previously described, thereby to securely fix the handles in place, but with the inner end portions thereof in such condition that they cannot be disturbed or rocked inwardly away from the inner hoop of the basket, as previously explained.

The mechanism for operating the rod 37, and the two subsequently described vertical rods 64, is as follows:

A vertically disposed lever 91 is pivoted on the stationary frame bracket 92 at 93, the upper portion of this lever being connected at 94 with the said rod 37, and there being a spring 95 attached to the upper end of said lever and to a stationary portion of the body frame of the machine, thereby tending to keep the upper end of said lever normally toward the front of the machine. A guide bracket 96 is secured to the body frame of the machine, forming a guide for the upper end portion of said lever 91, with an adjustable set screw 97 on the end of said bracket to form a definite stop for the motion of the lever toward the front of the machine. A cam 98 on the shaft 10 engages the rounded roller 99 on the lower end of the lever 91, thereby to actuate said lever in suitably timed relation to the other elements of said machine, causing actuation of the rod 37 and the consequent actuation of the clinching mechanism at the proper time. Adjacent said cam, and mounted to slide up and down in guides 100, there is a plate 101 to which the lower ends of the rod 64 are pivoted at 102, as shown. This plate has a slot 103 for the shaft 10, so that the plate is free to move up and down in said guides. Another cam 104 is mounted on the shaft 10, and the plate 101 is provided with a roller 105 to engage the groove 106 of this cam. In this way, rotation of the shaft causes simultaneous rotation of the two cams 98 and 104, and the consequence is that the lever 91 and the plate 101 are operated in suitably timed relation to the other elements of the machine, to cause the cutting off and forming of the wire handles, and the clinching of the ends thereof, in the manner previously described.

The machine can be controlled in any suitable or desired manner, as by a treadle 107, suitably connected through rods 108 and 109 with a starting clutch 110 of any suitable known or approved character.

It will be seen that the axes of the clinch blocks for clinching the inner ends of the wire handles, operate about parallel axes, and that these axes are parallel with the axis of the basket, but at right angles to the axis of the transverse rock shaft having the cams by which the clinch blocks are operated. Thus, the clinch block mechanism is disposed in position to operate inside of the basket, or within the basket, in order to assist in simultaneously fastening a plurality of handles to the rim of the basket. As shown, said handles are made of wire, being bail-shaped, as shown and described, and the clinch block mechanism is for the purpose of bending the inner ends of these handles against the inside of the rim of the basket, handles of this kind being illustrative of one use and mode of operation of the invention.

It will be understood that the term basket means any sort of container having a rim in which the handles or other wire devices may be inserted.

What I claim as my invention is:

1. In machinery for making and applying upstanding wire handles to baskets, the combination of instrumentalities for performing the successive steps necessary for cutting off a length of wire and forming the same into a bail-shaped wire handle member, and for inserting end portions of said wire member inwardly through the side of the basket, to form an upwardly extending handle, with exposed end portions inside the basket, mechanism having clinching means disposed entirely within the basket for deflecting and bending the inner straight ends of the wire member into position flat wise against the inner side of the basket, formed to position said inner ends at angles to the upright legs of said wire member, whereby said straight end portions will be disposed entirely inside of the basket, and power operated means for actuating said instrumentalities and said mechanism in suitably timed relation to simultaneously clinch the wire ends entirely on the inside of the basket.

2. A structure as specified in claim 1, said instrumentalities and said mechanism having duplicate parts at opposite sides of the machine, operative thereby to form and insert and clinch two handles simultaneously in the manner stated.

3. A structure as specified in claim 1, said mechanism comprising a pair of pivoted clinch blocks for engaging the ends of the wire member and including a rock shaft provided with cams, said clinch blocks having portions for engagement with said cams, and said cams being operative about a common axis extending transversely across the front of the machine.

4. A structure as specified in claim 1, said instrumentalities and said mechanism having duplicate parts at opposite sides of the machine, operative thereby to form and insert and clinch two handles simultaneously each with straight inner ends in the manner stated.

5. A structure as specified in claim 1, said mechanism comprising clinch blocks formed with deflecting grooves to receive the ends of the wire member, operative to deflect these ends outwardly and away from each other, so that these ends extend more or less horizontally away from each other inside of the basket.

6. A structure as specified in claim 1, said instrumentalities comprising means for first forming the bail-shaped member with straight parallel legs, and comprising means for thereafter bending these legs inwardly at right angles, so that these inwardly bent portions are parallel and in a common plane parallel with the rim of the basket, and said instrumentalities including driving means for thereafter forcing said bent end portions through the side of the basket and into engagement with said clinching mechanism.

7. A structure as specified in claim 1, said instrumentalities comprising means for first forming the bail-shaped member with straight parallel legs, and comprising means for thereafter bending these legs inwardly at right angles, so that these inwardly bent portions are parallel and in a common plane parallel with the rim of the basket, and said instrumentalities including driving means for thereafter forcing said bent end portions through the side of the basket and into engagement with said clinching mechanism, said instrumentalities and said mechanism having duplicate forming and driving and clinching elements at opposite sides of the machine, thereby to simultaneously form and insert and clinch two similar handles at opposite sides of the basket.

8. A structure as specified in claim 1, said instrumentalities comprising means for first forming the bail-shaped member with straight parallel legs, and comprising means for thereafter bending these legs inwardly at right angles, so that these inwardly bent portions are parallel and in a common plane parallel with the rim of the basket, and said instrumentalities including driving means for thereafter forcing said bent end portions through the side of the basket and into engagement with said clinching mechanism, said instrumentalities and said mechanism having duplicate forming and driving and clinching elements at opposite sides of the machine, thereby to simultaneously form and insert and clinch two similar handles at opposite sides of the basket, said machine having positioning means for supporting the basket on its side with the axis thereof extending horizontally and longitudinally of the machine, whereby the two wire handles are formed in vertical parallel planes at the opposite sides of the machine, and whereby the right angle end portions of the handle are formed in a common vertical transverse plane at the front of the machine, in which transverse plane these end portions are inserted through opposite sides of the basket.

9. A structure as specified in claim 1, said instrumentalities having the cutting and forming elements thereof duplicated at opposite sides of the machine, thereby to simultaneously form and insert two handles at opposite sides of the basket, and said clinching mechanism comprising upper and lower pivoted clinch blocks at opposite sides of the machine, in position to operate inside of the basket, said mechanism including a transverse rock shaft at the front of the machine, which shaft is provided with cams for simultaneously operating the four clinch blocks to bend the wire ends inside of the basket at the desired angles.

10. A structure as specified in claim 1, said instrumentalities having the cutting and forming elements thereof duplicated at opposite sides of the machine, thereby to simultaneously form and insert two handles at opposite sides of the basket, and said clinching mechanism comprising upper and lower pivoted clinch blocks at opposite sides of the machine, in position to operate inside of the basket, said mechanism including a transverse rock shaft at the front of the machine, which shaft is provided with cams for simultaneously operating the four clinch blocks to bend the wire ends inside of the basket at the desired angles, said four clinch blocks having deflecting grooves to deflect the wire ends away from each other at each side of the basket, whereby these wire ends are more or less horizontally disposed when the basket is right side up.

11. A structure as specified in claim 1, said instrumentalities being disposed in position to form the bail-shaped wire member in a vertical plane, and to thereafter bend the two ends of the bail-shaped member at right angles to the parallel legs of the bail-shaped member, in a vertical plane at right angles to said first mentioned plane, with said bent end portions extending straight toward the side of the basket, and said instrumentalities having driving means for thereafter moving the wire member bodily toward the basket to insert said bent wire ends through the rim of the basket.

12. In a machine for fastening handles to baskets, the combination of supporting means for supporting the basket with its top in position to have separate handles fastened to opposite sides of the rim thereof, instrumentalities for simultaneously fastening said handles in place on the rim of the basket, having cam actuated means operative in position within the basket, with the cams thereof oscillatory about a common axis extending through the opposite sides of the basket rim, and power devices for causing the operation of the elements of said instrumentalities in timed relation to simultaneously secure the separate handles in place in the desired manner.

13. A structure as specified in claim 12, said instrumentalities comprising wire-cutting and forming means disposed in position to cut and form a plurality of bail-shaped wire members, and for inserting the ends of said bail-shaped members through the rim of the basket, and comprising clinching mechanism disposed in position to operate inside of the basket, said mechanism having a plurality of pivoted clinch blocks for engaging and bending the inner ends of said handle members.

14. A structure as specified in claim 12, said instrumentalities comprising wire-cutting and forming means disposed in position to cut and form a plurality of bail-shaped wire members, and for inserting the ends of said bail-shaped members through the rim of the basket, and comprising clinching mechanism disposed in position to operate inside of the basket, said mechanism having a plurality of pivoted clinch blocks for engaging and bending the inner ends of said handle members, said mechanism also including a transverse rock shaft extending from one side of the basket to the other side thereof, with cams on said rock shaft for operating said pivoted clinch blocks, said power devices having means for actuating said rock shaft.

15. A structure as specified in claim 12, said instrumentalities comprising wire-cutting and forming means disposed in position to cut and form a plurality of bail-shaped wire members, and for inserting the ends of said bail-shaped members through the rim of the basket, and comprising clinching mechanism disposed in position to operate inside of the basket, said mechanism having a plurality of pivoted clinch blocks for engaging and bending the inner ends of said handle members, said mechanism also including a transverse rock shaft extending from one side of the basket to the other side thereof, with cams on said rock shaft for operating said pivoted clinch blocks, said power devices having means for actuating said rock shaft, said clinch blocks having rear ends provided with rollers adapted to engage said cams on the rock shaft, the axes of said clinch blocks extending at right angles to the axis of said rock shaft.

16. A structure as specified in claim 12, said instrumentalities comprising means for inserting wire through the rim of the basket, and comprising also clinching mechanism disposed in position to operate within the basket, said mechanism comprising a plurality of pivoted clinch blocks mounted to operate about axes extending at right angles to said cam axis.

17. A structure as specified in claim 12, said instrumentalities comprising means for inserting wire through the rim of the basket, and comprising also clinching mechanism disposed in position to operate within the basket, said mechanism comprising a plurality of pivoted clinch blocks mounted to operate about axes extending at right angles to said cam axis, said mechanism also including a transverse rock shaft having cams thereon for actuating said pivoted clinch blocks, simultaneously, the axis of said shaft extending at right angles to said axis of the basket.

18. A structure as specified in claim 12, said instrumentalities comprising means for bending wire to form bail-shaped members, and for inserting the ends of said members through the rim of the basket, and said instrumentalities comprising clinch mechanism disposed in position to operate inside of the basket, said mechanism including a pivoted clinch block for each wire end inserted through the rim of the basket, and including means operable about said cam axis for simultaneously operating said clinch blocks to bend the wire ends against the inside of the rim of the basket.

19. A structure as specified in claim 12, said instrumentalities comprising means for bending wire to form bail-shaped members, and for inserting the ends of said members through the rim of the basket, and said instrumentalities comprising clinch mechanism disposed in position to operate inside of the basket, said mechanism including a pivoted clinch block for each wire end inserted through the rim of the basket, and including means operable about said cam axis for simultaneously operating said clinch blocks to bend the wire ends against the inside of the rim of the basket, said clinch block operating means comprising two rigidly connected cams for simultaneously operating two of the clinch blocks, and comprising two similar cams for operating another pair of clinch blocks.

20. A structure as specified in claim 12, said instrumentalities comprising means for bending wire to form bail-shaped members, and for inserting the ends of said members through the rim of the basket, and said instrumentalities comprising clinch mechanism disposed in position to operate inside of the basket, said mechanism including a pivoted clinch block for each wire end inserted through the rim of the basket, and including means for simultaneously operating said clinch blocks to bend the wire ends against the inside of the rim of the basket, said clinch block operating means comprising two rigidly connected cams for simultaneously operating two of the clinch blocks, and comprising two similar cams for operating another pair of clinch blocks, and including a transverse rock shaft for operating said cam simultaneously.

21. A structure as specified in claim 12, said instrumentalities comprising means for simultaneously forming two bail-shaped wire members in parallel planes, at opposite sides of the basket, having means for thereafter bending the ends of said members inwardly toward the basket, and for inserting these bent ends inwardly through the basket rim, and said instrumentalities comprising means disposed in position to operate inside of the basket to bend the straight wire ends flatwise against the inside of the rim of the basket.

22. A structure as specified in claim 12, said instrumentalities comprising means for simultaneously forming two bail-shaped wire members in parallel planes, at opposite sides of the basket, having means for thereafter bending the ends of said members inwardly toward the basket, and for inserting these bent ends through the rim of the basket, and said instrumentalities comprising means disposed in position to operate inside of the basket to bend the wire ends against the inside of the rim of the basket, said mechanism comprising a pair of pivoted clinch blocks at one side of the basket, and a similar pair at the other side of the basket, together with a rock shaft having cams for simultaneously actuating both pairs of clinch blocks, causing the members of each pair to partially rotate in opposite directions.

23. A structure as specified in claim 12, said instrumentalities comprising means for simultaneously forming two bail-shaped wire members in parallel planes, at opposite sides of the basket, having means for thereafter bending the ends of said members inwardly toward the basket, and for inserting these bent ends through the rim of the basket, and said instrumentalities comprising means disposed in position to operate inside of the basket to bend the wire ends against the inside of the rim of the basket, said mechanism comprising a pair of pivoted clinch blocks at one side of the basket, and a similar pair at the other side of the basket, together with a rock shaft having cams for simultaneously actuating both pairs of clinch blocks, causing the members of each pair to partially rotate in opposite directions, the axis of said rock shaft extending at right angles to the axis of the basket, and the axes of said clinch blocks being parallel and extending at right angles to said shaft.

24. A structure as specified in claim 12, said instrumentalities comprising wire clinching mechanism disposed in position to operate within the basket, said mechanism including a plurality of pivoted clinch blocks and a transverse shaft provided with cams for simultaneously operating all of said clinch blocks, said power devices including a cam-operated vertically disposed lever and a link connecting the upper end of said lever with said rock shaft.

25. In a machine for attaching wire devices to a basket rim, the combination of means for inserting the wire device through the basket rim, and instrumentalities including clinch blocks operated about axes extending at right angles to the plane of the container rim, and parallel with the central axis of the basket, thereby to bend or clinch the end portions of the wire device.

26. In a machine for attaching wire devices to basket rims, the combination of means for inserting the wire device through the basket rim, simultaneously at diametrically opposite sides of the basket, and instrumentalities including means oscillatory about an axis extending through said diametrically opposite portions of the basket rim, thereby to bend or clinch the end portions of the wire device.

27. In a machine for attaching wire devices to basket rims, the combination of means for supporting the basket in position with its open side or mouth in a vertical plane, facing the front of the machine, means for inserting two diametrically opposite wire devices in the basket rim, a rock shaft extending across the mouth of the basket, between said diametrically opposite points of insertion of the two wire devices, an underneath shaft disposed parallel with the axis of the basket, a cam on said underneath shaft, a vertically disposed lever, a connection between the upper end of said lever and said rock shaft, means on the lower end of said lever to engage said cam, and means operated by said rock shaft to bend or clinch the ends of the wire devices.

28. In a machine for inserting wire devices in a basket rim, the combination of a plurality of cams oscillatory about an axis extending through diametrically opposite portions of the basket rim, and means actuated by said cams to bend or clinch the extreme ends of the insulated portions of the wire devices.

29. A structure as specified in claim 28, said axis having a pair of said cams at each end thereof, adjacent the two diametrically opposite portions of the basket rim, disposed within the mouth or open top of the basket, and said means actuated by said cams being operable to simultaneously bend or clinch the wire ends at opposite sides of the basket.

30. In a machine for inserting wire devices in a basket rim, the combination of means for inserting said devices entirely through the basket rim, in position to stand upright at the sides of the basket rim, and with exposed extreme ends of the inserted portions of the wire, so that each device can be bent outwardly and then back again, as in attaching a basket cover in place, and clinching mechanism operable entirely inside the basket to bend or clinch the extreme ends of the wire against the inner side of the basket rim, whereby when the basket is right side up these inner ends will extend more or less horizontally a distance below the top of the basket rim.

31. A structure as specified in claim 36, said clinching mechanism being operable to turn the two wire ends of each wire device outwardly in opposite directions away from each other.

32. In machinery for making and applying upstanding wire handles to baskets, the combination of instrumentalities for performing the successive steps necessary for cutting off a length of wire and forming the same into a bail-shaped wire handle member, and for inserting end portions of said wire member through the side of the basket, to form an upwardly extending handle, mechanism having clinching means for deflecting and bending the inner straight ends of the wire member into position flatwise against the inner side of the basket, formed to position said inner ends at angles more or less horizontal to the upright legs of said wire member, whereby said straight end portions will be disposed entirely inside of the basket, and power operated means for actuating said instrumentalities and said mechanism in suitably timed relation, said instrumentalities having the cutting and forming elements thereof duplicated at opposite sides of the machine, thereby to simultaneously form and insert two handles at opposite sides of the basket, and said clinching mechanism comprising upper and lower pivoted clinch blocks at opposite sides of the machine, in position to operate inside of the basket, said mechanism including a transverse rock shaft at the front of the machine, which shaft is provided with cams for simultaneously operating the four clinch blocks to bend the wire ends inside of the basket at the desired angles.

33. In machinery for making and applying upstanding wire handles to baskets, the combination of instrumentalities for performing the successive steps necessary for cutting off a length of wire and forming the same into a bail-shaped wire handle member, and for inserting end portions of said wire member through the side of the basket, to form an upwardly extending handle, mechanism having clinching means for deflecting and bending the inner straight ends of the wire member into position flatwise against the inner side of the basket, formed to position said inner ends at angles more or less horizontal to the upright legs of said wire member, whereby said straight end portions will be disposed entirely inside of the basket, and power operated means for actuating said instrumentalities and said mechanism in suitably timed relation, said instrumentalities having the cutting and forming elements thereof duplicated at opposite sides of the machine, thereby to simultaneously form and insert two handles at opposite sides of the basket, and said clinching mechanism comprising upper and lower pivoted clinch blocks at opposite sides of the machine, in position to operate inside of the basket, said mechanism including a transverse rock shaft at the front of the machine, which shaft is provided with cams for simultaneously operating the four clinch blocks to bend the wire ends inside of the basket at the desired angles, said four clinch blocks having deflecting grooves to deflect the wire ends away from each other at each side of the basket, whereby these wire ends are more or less horizontally disposed when the basket is right side up.

34. In machinery for making and applying upstanding wire handles to baskets, the combination of instrumentalities for performing the successive steps necessary for cutting off a length of wire and forming the same into a bail-shaped wire handle member, and for inserting end portions of said wire member through the side of the basket, to form an upwardly extending handle, mechanism having clinching means for deflecting and bending the inner straight ends of the wire member into position flatwise against the inner side of the basket, formed to position said inner ends at angles more or less horizontal to the upright legs of said wire member, whereby said straight end portions will be disposed entirely inside of the basket, and power operated means for actuating said instrumentalities and said mechanism in suitably timed relation, said instrumentalities being disposed in position to form the bail-shaped wire member in a vertical plane, and to thereafter bend the two ends of the bail-shaped member at right angles to the parallel legs of the bail-shaped member, in a vertical plane at right angles to said first mentioned plane, with said bent end portions extending straight toward the side of the basket, and said instrumentalities having driving means for thereafter moving the wire member bodily toward the basket to insert said bent wire ends through the rim of the basket.

35. In a machine for fastening handles to baskets, the combination of supporting means for supporting the basket with its top in position to have separate handles fastened to opposite sides of the rim thereof, instrumentalities for simultaneously fastening said handles in place on the rim of the basket, having cam actuated means operative in position within the basket, with the cams thereof operable about a common axis extending through the opposite sides of the basket rim, and power devices for causing the operation of the elements of said instrumentalities in timed relation to simultaneously secure the separate handles in place in the desired manner, said instrumentalities comprising wire clinching mechanism disposed in position to operate within the basket, said mechanism including a plurality of pivoted clinch blocks and a transverse shaft provided with cams for simultaneously operating all of said clinch blocks, said power devices including a cam-operated vertically disposed lever and a link connecting the upper end of said lever with said rock shaft.

Specification signed this 13th day of May, 1931.

LESLIE M. HILE.

CERTIFICATE OF CORRECTION.

Patent No. 1,900,712. March 7, 1933.

LESLIE M. HILE.

It is hereby certified that error appears in the printed specification of the above numbered patent requiring correction as follows: Page 9, line 68, claim 31, for "36" read "30"; and that the said Letters Patent should be read with this correction therein that the same may conform to the record of the case in the Patent Office.

Signed and sealed this 16th day of May, A. D. 1933.

(Seal)

M. J. Moore.
Acting Commissioner of Patents.